Dec. 19, 1939.  G. H. COREY  2,184,138
METHOD AND APPARATUS FOR PRODUCING OPTICAL EFFECTS
Filed Dec. 23, 1938

GEORGE H. COREY
INVENTOR.

BY John P. Nisonow
ATTORNEY.

Patented Dec. 19, 1939

2,184,138

UNITED STATES PATENT OFFICE 2,184,138

METHOD AND APPARATUS FOR PRODUCING OPTICAL EFFECTS

George H. Corey, New York, N. Y., assignor of one-half to Elmon C. Gillette, New York, N. Y.

Application December 23, 1938, Serial No. 247,454

4 Claims. (Cl. 272—9)

My invention relates to method and apparatus for producing optical effects and has particular reference to the use of polarized light.

My invention has for its object to provide an apparatus for producing novel optical effects by means of polarized light, particularly for the illumination of objects on the stage, advertising purposes, etc. I use for this purpose screens made of "Polaroid", one such screen being placed in front of the lamp in a projector and the other screen being placed in front of an object on the stage, as, for instance, forming a part of clothing of an actor. The projector screen can be rotated, so as to vary the angular relation between the planes of polarization of the screens thereby rendering the stage screen either transparent or opaque with varying degree of opacity. I can also employ an additional screen in the projector made of a thin sheet of "Cellophane", provision being made to insert colorless "Cellophane" sheets of different thickness. I have discovered that "Cellophane", when used with polarized light, changes the color of objects viewed through a "Polarized" screen. I have also found that the color can be changed by changing the thickness of the "Cellophane" sheet or by rotating the "Cellophane" screen. Thus, for instance, by passing a "Cellophane" sheet of progressively varying thickness in front of the polarizing screen in the projector, a very striking optical effect may be produced consisting in gradual changing of the colors of the "Polaroid" screen on the object. This effect is due to a peculiar structure of "Cellophane" consisting of doubly refracting crystals, which cause partial retardation of light waves in the polarized light. Other doubly refracting substances can be used for the same purpose, such as mica, selenite, etc. This effect is entirely lacking with other transparent substances such as cellulose acetate. My apparatus is particularly useful for producing optical effects on the stage, by providing actors with dress made of "Polaroid", so that it can be made either transparent or opaque, and changing its color by the use of a colorless "Cellophane" screen.

My invention is more fully described in the accompanying specification and drawing in which—

Figure 1:
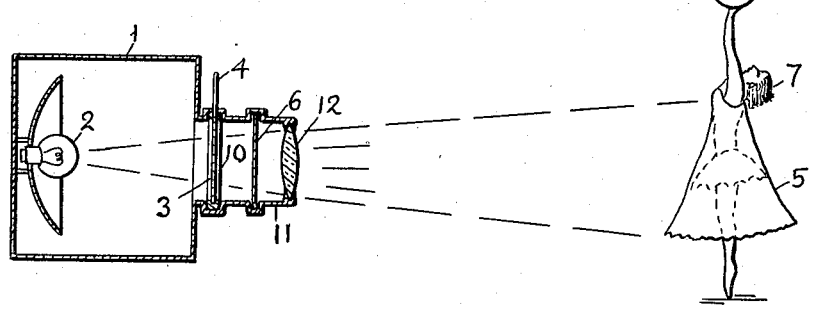
Fig. 1 is a sectional elevational view of my apparatus as used for illuminating an object on a stage.

My apparatus consists of a projector 1 with a lamp or similar source of light 2. A screen 3 is placed in the path of the light from the lamp, the screen being made of a sheet of transparent "Polaroid" supported in a frame 10 rotatively fitted in an annular recess in the objective mount 11 of the projector back of the lens 12. The frame 10 is provided with a handle 4 for turning it into different positions within an angle of 90°, these positions being shown in Fig. 2 with solid and dotted lines respectively. The projector is used for illuminating objects on the stage such as a dancer 7 having an outer dress 5 made of a thin sheet of "Polaroid". By rotating the projector screen 3, the plane of polarization of the "Polaroid" screen 3 can be placed in different positions in relation to the plane of polarization of the dress 5 thereby rendering the dress either fully transparent or fully opaque, with intermediate degrees of opacity for intermediate angles of displacement of the two planes.

A second screen 6 is inserted in a guide 13 in the mount 11, this screen being made of a sheet of a colorless "Cellophane" or other similar doubly refracting crystalline material. This material has a property of imparting a certain color to the "Polaroid" sheet 5, the color depending on the thickness of the sheet of "Cellophane".

Figure 2:
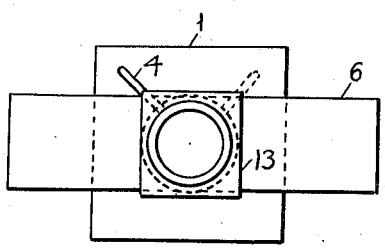
Fig. 2 is a front view of my projector.
Figure 3:
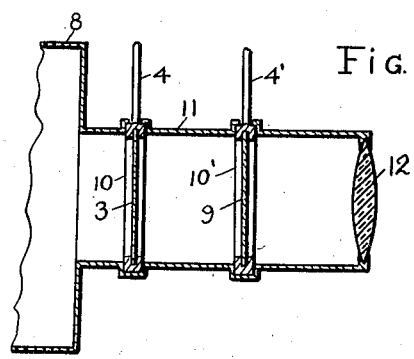
Fig. 3 is a fractional sectional view of the projector.

The screen 6 can be made in the form of a strip as shown in Fig. 2, different portions of the strip having different thickness, so that the color of the dress 5 can be changed by shifting the strip in the guide 13. The colors can be made to merge gradually into each other if the thickness changes gradually from one portion of the strip to the other. Different thickness can be also obtained by making the strip of several layers and varying the number of layers in different portions of the strip. The same effect can be also obtained by rotating the "Cellophane" screen which for this purpose may be placed in a frame 10' as shown in Fig. 3, the frame having a handle 4'.

It is understood that my projector and system may be further modified without departing from the spirit of my invention as set forth in the appended claims.

I claim as my invention:

1. A method of producing optical effects on an opaque object positioned on a stage, consisting in covering the object with a thin sheet of a light polarizing normally transparent material, projecting on the object a beam of polarized light, and varying the angle of polarization of the projected light, so as to change the transparency of the covering and thereby rendering the object selectively visible or invisible.

2. Means to produce on a stage optical effects on an opaque object wrapped in a thin sheet of normally transparent "Polaroid" comprising means to throw a beam of a polarized light on the object for allowing an audience to view the object in a light reflected from the object through the "Polaroid", and means to rotate the angle of polarization of the beam of light for changing the transparency of the wrapping while maintaining the object fully illuminated.

3. Means to produce on a stage optical effects on an object wrapped in a thin sheet of normally transparent "Polaroid", comprising means to throw a beam of a polarized light on the object for allowing an audience to view the object in a light reflected from the object through the "Polaroid", and a screen of a doubly refracting material of varying thickness movably mounted for varying the color of the light reflected from the object.

4. A method of producing optical effects on an object positioned on a stage, consisting in covering the object with a thin sheet of a light polarizing, normally transparent material, projecting on the object a beam of polarized light, imparting a color to the light reflected from the object by placing in the path of the beam of light a screen made of a doubly refracting material of a selected thickness, and changing the color by changing the thickness of the screen material.

GEORGE H. COREY.